INVENTORS
STEWART E. SEAMAN
ROBERT P. KING
BY
ATTORNEY

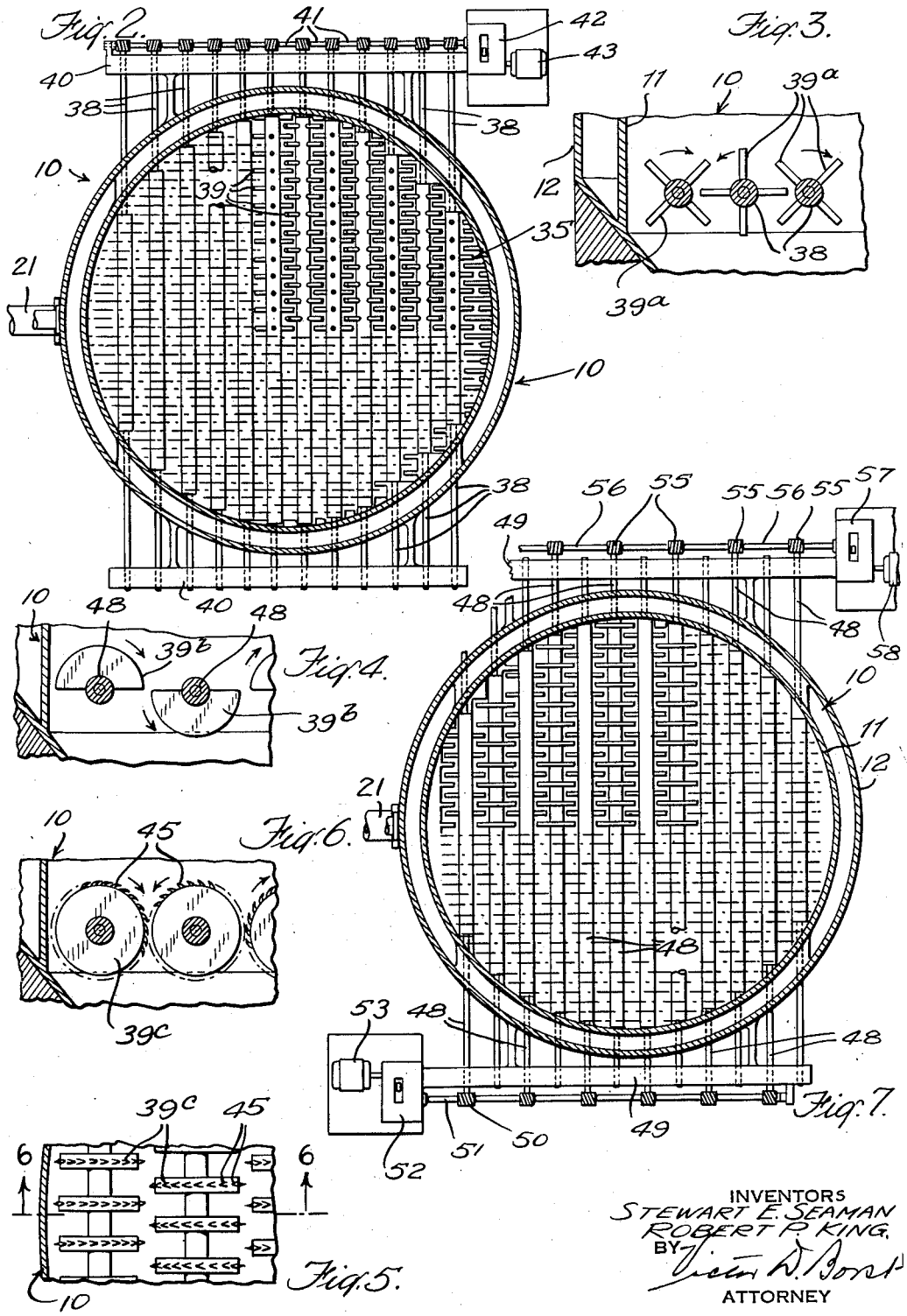
Dec. 6, 1949    S. E. SEAMAN ET AL    2,490,097
PROCESS FOR AGING ALKALI CELLULOSE
Filed March 15, 1947    3 Sheets-Sheet 2
INVENTORS
STEWART E. SEAMAN
ROBERT P. KING
ATTORNEY

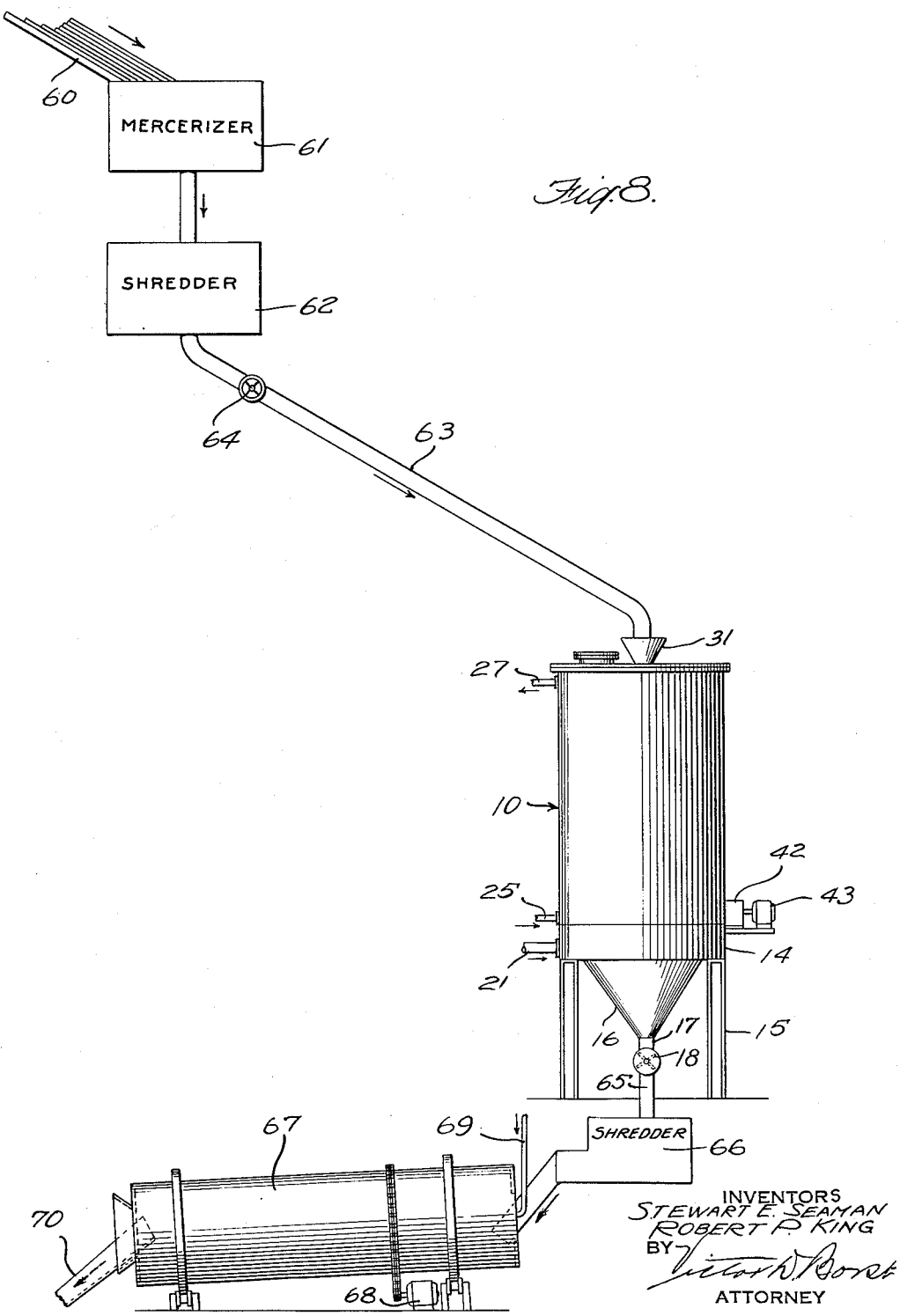

Patented Dec. 6, 1949

2,490,097

UNITED STATES PATENT OFFICE 2,490,097

PROCESS FOR AGING ALKALI CELLULOSE

Stewart E. Seaman, White Plains, N. Y., and Robert P. King, Richland, Wash.

Application March 15, 1947, Serial No. 735,002

3 Claims. (Cl. 260—233)

This invention relates to an apparatus and method for aging alkali cellulose in the viscose process and has for an object to provide for the continuous handling of the alkali cellulose through the ripening or aging step.

Another object is to provide for the uniform processing of the alkali cellulose under controlled conditions.

Another object is to provide equipment for the above purpose which may be economically operated on a commercial scale.

Another object is to provide continuous aging equipment which is adapted for use with continuous mercerizing and shredding apparatus and with continuous xanthation apparatus.

Various other objects and advantages will be apparent as the nature of the invention is more fully disclosed.

In the viscose process the pulp in the form of sheets or slurry is steeped in a caustic soda solution having a concentration of about 14½% to 18% caustic, at a definite temperature and for a time suited to dissolve the hemicellulose and leave the sheet or slurry with a high α cellulose content. The sheets or alkali cellulose mass from the slurry may then be pressed by means of a hydraulic ram or other suitable press to squeeze out the surplus caustic which may be recovered. The resulting alkali cellulose product may then be treated in shredder machines where the alkali cellulose is reduced to soft crumbs by a shredding operation which loosens, blends and fluffs up the cellulose fibres. During this operation the alkali cellulose is preferably kept at a temperature of about 18° to 50° C. The crumbs are then aged for a substantial period of time under controlled conditions, after which they are treated with carbon disulphide to form cellulose xanthate which may be dissolved in dilute caustic soda to form a viscose spinning solution.

The present invention relates particularly to the aging step and provides a vertical tower into which the crumb is continuously fed from the shredder and is allowed to settle downwardly through the tower while being continuously removed from the bottom at a controlled rate so as to maintain the crumb in the tower for a predetermined period of time. The tower may be provided with a temperature control jacket for maintaining the crumb under desired temperature conditions during the aging process. It may also be provided with means for passing air or inert gas upwardly through the tower as desired for facilitating the treatment. The crumb is removed from the bottom of the tower by suitable rotating pickers which serve to tear the crumb from the lowest layer in the tower and to pass the same at a controlled rate to a discharge hopper.

The aging or ripening process in the tower requires a period of several hours time during which the viscosity of the cellulose is gradually reduced. This is thought to be effected by oxidation of the alkali cellulose and the consequent shortening of the molecular chain. It is necessary to control closely the time and temperature and the admission of air or oxygen or other gas to the fibres in the tower. A variation in time requires a variation in temperature and vice versa. Excess admission of oxygen or carbon dioxide to the alkali cellulose crumb may result in the formation of sodium carbonate which affects adversely the subsequent xanthation process. Hence it is important to control closely all of these variable factors during the aging period.

The novel features which are believed to be characteristic of this invention are pointed out more particularly in the accompanying claims. The nature of the invention, however, will be better understood by referring to the following description, taken in connection with the accompanying drawings in which a specific embodiment thereof has been set forth for purposes of illustration.

In the drawings:

Fig. 2 is a horizontal section taken on the line 2—2 of Fig. 1 showing the arrangement of the discharge pickers;

Fig. 3 is an enlarged detail view illustrating one type of picker;

Fig. 4 is a similar detail view illustrating a different type of picker;

Fig. 5 is a partial plan view illustrating a third type of picker;

Fig. 6 is a section taken on the line 6—6 of Fig. 5;

Fig. 7 is a sectional view similar to Fig. 2 showing a modified type of drive means for the pickers; and Fig. 8 is a schematic flow diagram illustrating the present process.

Figure 1:
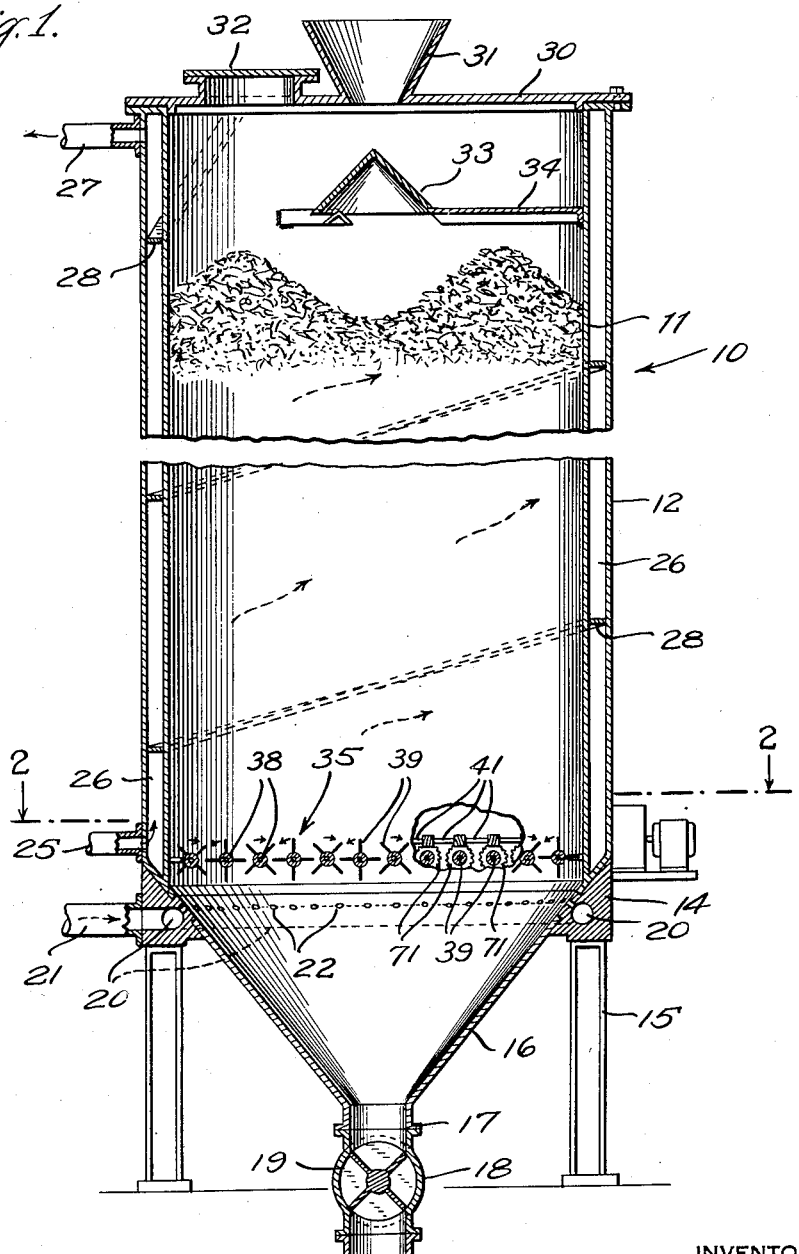
Fig. 1 is a vertical section through an aging tower embodying the present invention.

Referring to the drawings more in detail, the invention is shown in Fig. 1 as embodied in a tower 10 comprising an inner cylindrical shell 11 and an outer cylindrical shell 12 spaced therefrom to form a fluid jacket 26. The shells 11 and 12 are shown as mounted on a base ring 14 which is supported on legs 15. The ring 14 also carries a conical discharge hopper 16 terminating in a discharge duct 17 having a ball valve 18 including rotating vanes 19 which are adapted to discharge the crumb at a controlled rate while maintaining a vapor seal.

The supporting ring 14 is also shown as provided with an annular passage 20 communicating with an inlet duct 21 and having an annularly spaced row of discharge openings 22 arranged to supply the selected gas to the interior of the tower. An inlet duct 25 communicates with the jacket 26 between the shells 11 and 12 for the admission of temperature control fluids and a discharge duct 27 is connected to remove the fluids from said jacket. Suitable baffles 28 may be provided to effect a uniform flow of the temperature control fluid around the jacket 26 between the inlet duct 25 and the outlet duct 27.

The tower 10 is shown as provided with a cover 30 having a supply hopper 31 through which the crumb is supplied to the tower, and having a manhole cover 32 for maintenance purposes. A conical distributor 33 is shown as provided beneath the supply hopper 31 and mounted on struts 34 for distributing the material uniformly across the tower. Such distributor may, of course, be modified or omitted as desired.

A discharge picker assembly 35 extends across the bottom of the tower above the fluid inlet openings 22. As shown in Fig. 2 this assembly comprises a plurality of shafts 38 carrying picker fingers 39 and journaled in supports 40 on opposite sides of the tower. The shafts 38 are shown as provided with worm gears meshing with suitable worms mounted on a shaft 41 driven through a gear reduction box 42 by a motor 43. The worm gears are preferably designed to cause alternate shafts 38 to rotate in opposite directions, although in certain instances they may be arranged to cause the shafts to all rotate in the same direction. The drive may be controlled to cause the shafts to rotate continuously or intermittently as required.

The picker fingers 39 may take the form of crossed rods 39a as shown in Fig. 3 or of semi-circular segmental members 39b as shown in Fig. 4 or of discs 39c as shown in Figs. 5 and 6. The discs 39c are shown as provided with pins 45 which are inclined in the direction of rotation of the various discs to engage and pick the cellulose fibres from the crumb in the tower.

In the embodiment shown in Fig. 7 a plurality of shafts 48 extend through the tower similarly to the shafts 38 of Fig. 2 and are journaled in supports 49 on opposite sides of the tower. In this embodiment alternate shafts 48 are driven through worms 50 from a shaft 51 through a gear train 52 from a motor 53, and the other alternate shafts 48 are driven through worms 55 from a shaft 56 through a gear train 57 from a motor 58. In this embodiment suitable control may be provided for causing the motors 53 and 58 to operate alternately so that the various shafts are intermittently driven and one set of shafts constitutes a support to hold and support the fibres in the tower while the other rotating shafts serve to pick the fibres from the stack and discharge the same through the discharge hopper 16. In this way a uniform distribution of the fibres may be obtained.

Referring to Fig. 8 the pulp sheets are indicated as fed by a conveyor 60 to a mercerizing unit 61 in which they are treated with dilute caustic and then pressed for the removal of the caustic therefrom in the usual manner. From the unit 61 the pressed sheets are fed to a shredder 62 in which they are shredded and fluffed to form crumbs and are fed through a pipe 63 to the hopper 31 of the tower 10 above described. Suitable control means shown as ball valve 64 may be provided to control the rate of feed to the tower 10.

From the discharge duct 17 of the tower 10 the aged alkali cellulose is fed through a duct 65 to a shredder 66, thence to a continuous xanthating drum 67 which may be of type shown in the Seaman application Serial No. 711,339, filed November 21, 1946, for Continuous xanthation, and is adapted to be slowly rotated by means of a motor 68 while carbon disulphide is introduced through a pipe 69 at a controlled rate. The crumb advances along the drum 67 at a rate such that the formation of cellulose xanthate has been completed by the time the material reaches the opposite end of the drum from which the xanthate is discharged through a duct 70. The crumb may of course be fed from the tower 10 to any standard xanthator, either continuous or batch as desired. A specific type of xanthator has been shown for illustration only.

It will be noted that the above described process is continuous throughout as distinguished from batch processes in which the aging takes place in individual cans or the like. Also that the aging conditions may be accurately controlled to effect uniform treatment. The rate of feed into the hopper 31 is so adjusted with respect to the rate of discharge from the aging tower that the material passes continuously through the tower in a predetermined length of time and the tower preferably has a capacity such that it remains substantially full at all times. The temperature is likewise controlled by the admission of heating or cooling fluids through the duct 25 and the removal thereof through the duct 27 as required. If air or inert gas is to be supplied to the alkali cellulose its admission may be accurately controlled through the duct 21 and the inlet openings 22 so as to maintain the desired atmosphere within the tower.

It is to be understood that the tower 10 may be of cylindrical, square, or other cross section and that the internal surface may be of a metal, tile or other material which is unaffected by the alkali cellulose and to which the alkali cellulose will not adhere. It may be constructed with a slight flare at the bottom to facilitate the downward passage of the crumb if desired.

The shredder 66 may be omitted if the crumb is removed from the tower in suitable condition for xanthation. The supply and discharge from the tower may be interlocked or manually controlled to assure a constant controlled time of aging between admission and discharge.

As a specific example, cellulose mercerized with dilute NaOH (about 18%) and separated from the excess steeping solution by pressing to a ratio of about 1 part cellulose to 1.7 parts dilute NaOH is shredded or opened to suitable fluffiness so that its unit weight is from 8 to 10 pounds cellulose per cubic foot (from 19 to 27 pounds of alkali cellulose per cubic foot). This may be fed into a tower about 12 feet in diameter, 55 feet high inside dimensions holding about 60 tons of alkali cellulose. The feed and discharge rate may be adjusted to about 5,000 pounds alkali cellulose per hour, allowing 24 hours' ripening time at temperature of from 25° to 50° C. Such equipment would have a capacity of 22.2 tons of cellulose (60 tons alkali cellulose) per 24 hour day.

In another embodiment cellulose steeped in 16.5% NaOH, pressed to a ratio of one part cellulose to 1.5 parts dilute NaOH, is opened or shredded to a unit weight of 10–12 pounds cellulose per cubic foot (about 25 to 30 pounds alkali cellulose per cubic foot). This may be fed into a tower 15 feet in diameter by 40 feet high inside dimensions holding about 85 tons of alkali cellulose at a rate of 11,250 pounds of alkali cellulose per hour, allowing 15 hours' ripening time at a temperature of 40° C. This equipment would have a capacity of 54 tons of cellulose (135 tons alkali cellulose) per 24 hour day.

It is to be understood that a specific embodiment of the invention has been shown and described for purposes of illustration only and that the invention is capable of various uses and adaptations. Suitable changes and modifications will be apparent to a person skilled in the art. The invention is only to be restricted in accordance with the scope of the following claims.

What is claimed is:

1. The method of aging alkali cellulose in the viscose process which comprises treating the alkali cellulose to loosen, blend and fluff up the fibres in the form of a crumb, continuously spreading the crumb uniformly across the top of a vertical aging zone of uniform cross sectional area throughout its height, maintaining said zone full of said crumb and allowing the contents to settle by gravity, and continuously engaging and picking the crumb to remove the same uniformly from across the bottom area of said zone under conditions to cause all of the crumb particles to settle at the same uniform rate to the bottom of said zone so that all of the crumb remains in said zone for the same length of time in its passage from the top to the bottom thereof.

2. In the method set forth in claim 1, controlling the temperature of the external wall of said zone during the passage of the crumb therethrough.

3. In the method set forth in claim 1, continuously passing a gas through said zone under conditions to maintain a selected temperature and atmosphere therein.

STEWART E. SEAMAN.
ROBERT P. KING.

REFERENCES CITED

The following references are of record in the file of this patent:

UNITED STATES PATENTS

| Number | Name | Date |
|---|---|---|
| 530,996 | Kellner | Dec. 18, 1894 |
| 1,842,688 | Richter | Jan. 26, 1932 |
| 2,005,811 | Steimmig | June 25, 1935 |
| 2,077,164 | Brandes | Apr. 13, 1937 |
| 2,149,309 | Peterson et al. | Mar. 7, 1939 |
| 2,149,310 | Peterson et al. | Mar. 7, 1939 |

FOREIGN PATENTS

| Number | Country | Date |
|---|---|---|
| 643,902 | France | Sept. 25, 1928 |
| 696,411 | France | Oct. 14, 1930 |